(12) United States Patent
Engwer

(10) Patent No.: US 6,824,681 B2
(45) Date of Patent: Nov. 30, 2004

(54) COMPOST BERM

(76) Inventor: John Engwer, 715 East St., Wrentham, MA (US) 02093-1132

(*) Notice: Subject to any disclaimer, the term of this patent is extended or adjusted under 35 U.S.C. 154(b) by 20 days.

(21) Appl. No.: 10/280,837

(22) Filed: Oct. 25, 2002

(65) Prior Publication Data

US 2004/0079699 A1 Apr. 29, 2004

(51) Int. Cl.$^7$ .............................. C02F 3/32; E02D 5/00
(52) U.S. Cl. ....................... 210/602; 210/170; 210/747; 405/258.1; 405/302.7
(58) Field of Search ................................ 210/602, 170, 210/262, 484, 489, 747, 263; 405/80, 258.1, 302.4, 302.6, 302.7

(56) References Cited

U.S. PATENT DOCUMENTS

| | | | | |
|---|---|---|---|---|
| 3,441,140 A | * | 4/1969 | Thurber et al. | 210/170 |
| 3,957,098 A | * | 5/1976 | Hepworth et al. | 383/45 |
| 5,338,131 A | * | 8/1994 | Bestmann | 405/24 |
| 5,421,123 A | * | 6/1995 | Sakate et al. | 47/56 |
| 5,595,458 A | * | 1/1997 | Grabhorn | 405/302.6 |
| 5,679,247 A | | 10/1997 | Burke | |
| 5,747,633 A | | 5/1998 | Ito et al. | |
| 5,795,099 A | * | 8/1998 | Parker | 405/28 |
| 5,854,304 A | | 12/1998 | Garcia et al. | |
| 6,109,835 A | * | 8/2000 | Grabhorn | 405/302.6 |
| 6,585,452 B1 | * | 7/2003 | Hoeck, Jr. | 405/4 |
| 2002/0168234 A1 | * | 11/2002 | Hild | 405/302.4 |
| 2003/0031511 A1 | * | 2/2003 | Tyler | 405/15 |

FOREIGN PATENT DOCUMENTS

| | | | | |
|---|---|---|---|---|
| GB | 2332353 A | * | 6/1999 | |
| JP | 11-323940 A | * | 11/1999 | |
| JP | P2002-161524 A | * | 6/2002 | |

OTHER PUBLICATIONS

EPA Information Document, EPA 530–F–97–042, "Bioremediation and Pollution Prevention, Innovative Uses of Compost", Oct. 1997, pp. 1–6.
EPA Information Document, EPA 530–F–97–046, "Reforestation, Wetlands Restoration, and Habitat Revitalization, Innovative Uses of Compost", Oct. 1997, pp. 1–4.
EPA Information Document, EPA 530–F–97–045, "Composting of Soils Contaminated by Explosives, Innovative Uses of Compost", Oct. 1997, pp. 1–4.
EPA Information Document, EPA 530–F–97–044, "Disease Control for Plants and Animals, Innovative Uses of Compost", Oct. 1997, pp. 1–4.
EPA Information Document, EPA 530–F–97–043, "Erosion Control, Turf Remediation, and Landscaping, Innovative Uses of Compost", Oct. 1997, pp. 1–8.

(List continued on next page.)

*Primary Examiner*—Fred G. Prince
(74) *Attorney, Agent, or Firm*—Cesari and McKenna, LLP; Stephen E. Kabakoff

(57) ABSTRACT

An erosion barrier implementing the invention is a filter berm advantageously comprising a biodegradable "sock" filled with a biodegradable material, e.g., using conventional blower techniques. The sock is composed of materials, such as burlap, that naturally rot and decompose. Thus, when the sock decays, it merges into the surrounding soil and thus leaves no trace. Preferably, the biodegradable material comprises compost that is pre-seeded to allow desired vegetation to grow from the compost into the under-lying soil. In this manner, the vegetation anchors the berm and prevents it from eroding, even when its exterior sock is fully decomposed. In an exemplary embodiment, the sock may be constructed with larger holes on its bottom so as to allow the material in the berm to effectively bind and adhere to the soil beneath.

16 Claims, 3 Drawing Sheets

OTHER PUBLICATIONS

Welcome to the World of Filtrexx Erosion Control Products, Green Horizons, Aug. 2001.

Tyler, R., "Streambank Stablization Using a New BMP . . . Compost?", Land and Water, Mar.–Apr. 2002, pp. 22–25.

Technovation, Current News and Events on Inovative Environmental Technologies, vol. 1999–2, pp. 1–8.

Albright Seed Company, "Construction Site Erosion: Costly, Illegal," http://www.albrightseed.com/erosion.htm, Copyright 1997,1998, Streamline Publications.

* cited by examiner

COMPOST BERM

FIELD OF THE INVENTION

The present invention relates to soil erosion control, and more specifically to compost filter berms.

BACKGROUND OF THE INVENTION

Soil movement processes can have deleterious effects in areas sensitive to erosion and sedimentation. In general, these processes result in the loss of topsoil and facilitate the spread of pollutants. As a result, erosion control techniques are often required to inhibit soil movement from building or road construction sites. These techniques include, for example, the installation of perimeter barriers such as straw bales, silt fences and compost filter berms.

Straw bales are typically placed around a designated area, e.g., a construction site, to physically impede the transport of settleable solids from the site. While these bales are relatively inexpensive and easy to install, they are unsightly and must be removed after construction is completed. Furthermore, the bales may be displaced by heavy water runoff events, thereby rendering them ineffectual for controlling soil movement in those occurrences.

Silt fences also block soil movement into and out of designated areas. However, they too are aesthetically unpleasing and must be removed after use. In addition, as compared with other erosion control techniques, construction and installation of the fences is expensive.

In contrast, compost filter berms (mounds) are inexpensive to install and need not be removed. These berms not only physically filter settleable solids from water runoff, but also comprise microorganisms that degrade many organic compounds and bind other pollutants. Furthermore, compost berms can enrich the surrounding soil by adding organic matter. Specifically, they promote seed establishment and plant growth, resulting in a more aesthetically pleasing implementation than straw bales and silt fences. However, the compost filter berms may "spread," i.e., erode, and may have to be reconstructed.

To prevent a compost filter berm from prematurely spreading, a synthetic mesh tube or "sock" is sometimes placed around the berm. Specifically, the sock is filled with compost during the berm's installation, using a conventional blower. In operation, water runoff permeates the mesh tube, and sediment in the runoff is filtered by the compost. When the sock is no longer needed for soil erosion control, the synthetic tube is removed. Sock removal consumes time and labor resources.

SUMMARY OF THE INVENTION

An erosion barrier implementing the invention is a filter berm advantageously comprising a biodegradable "sock" filled with a biodegradable material, e.g., using conventional blower techniques. The sock is composed of materials, such as burlap, that naturally rot and decompose. Thus, when the sock decays, it merges into the surrounding soil and thus leaves no trace. Preferably, the biodegradable material comprises compost that is pre-seeded to allow desired vegetation to grow from the compost into the under-lying soil. In this manner, the vegetation anchors the berm and prevents it from eroding, even when its exterior sock is fully decomposed. In an exemplary embodiment, the sock may be constructed with larger holes on its bottom so as to allow the material in the berm to effectively bind and adhere to the soil beneath.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

Figure 1:
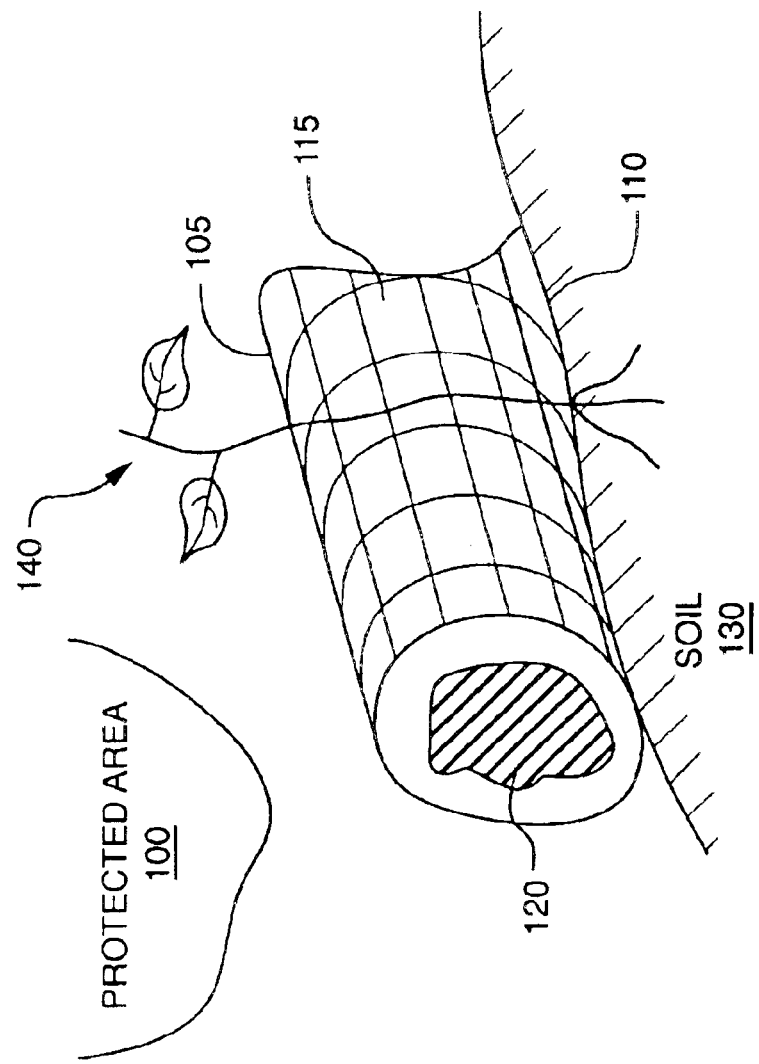
FIG. 1 illustrates a compost berm in a biodegradable sock, in accordance with an embodiment of the invention.

As shown in FIG. 1, a filter berm 110 is placed adjacent to an area 100, such as a lake, river or field, sensitive to soil movement processes. The berm comprises a biodegradable mesh tube 105 that is substantially filled with biodegradable material 120. Preferably, the biodegradable material is a mixture containing compost and seeds of one or more desirable plant species, although the material 120 is broadly understood to encompass other biodegradable matter that may include, e.g., woodchips or leaves. As defined herein, the biodegradable tube is capable of being decomposed by biological agents, such as bacteria. The berm prevents settleable material from infiltrating the protected area. Thus, soil and other settleable materials are filtered from water runoff that permeates the berm, and the contained seeds germinate to provide new vegetation 140. Eventually the new vegetation anchors the berm in the underlying soil 130 so as to maintain the structure of the berm even after its exterior mesh tube has fully decomposed.

The tube or sock 105 is constructed from one or more materials, such as burlap, that naturally rot and/or decay, e.g., due to the action of microorganisms. As such, the biodegradable mesh completely disintegrates, even in the absence of sunlight, leaving a permanent berm that blends into its surroundings. The biodegradable tube is constructed having holes 115 that are small enough to facilitate the passage of air while substantially blocking the passage of the biodegradable material 120 when the latter is blown into the sock. More specifically, a portion of the biodegradable tube may be placed on the soil 130 while the remainder of the tube is placed around a nozzle connected to a blower that substantially fills the tube, e.g., with seeded compost. When the sock is filled in this manner, it is withdrawn from the nozzle (or vice versa) at a rate that allows the sock to be filled by a desired amount of compost.

Figure 2:
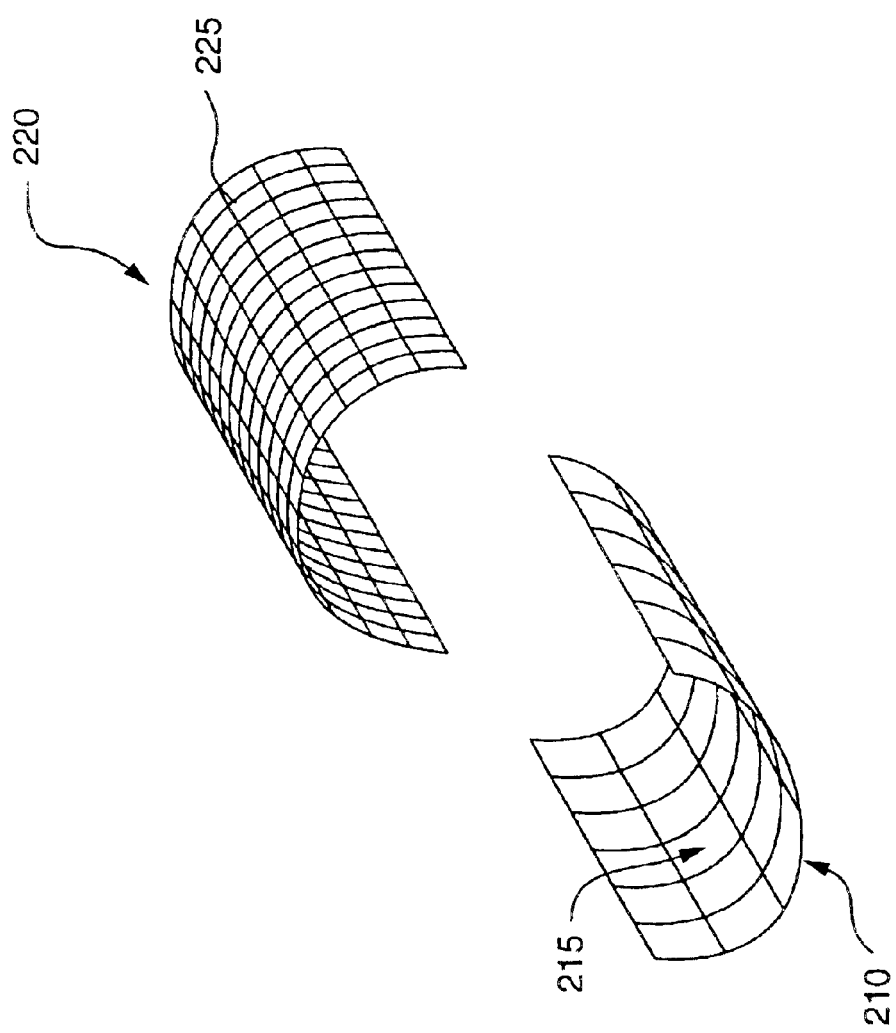
FIG. 2 illustrates a biodegradable sock, in accordance with the invention, having different hole sizes on its top and bottom.

In the embodiment illustrated in FIG. 2, the mesh tube is constructed from two biodegradable strips sewn together along their longitudinal edges. Preferably, though not necessarily, the holes 215 in the bottom strip 210 are larger than the holes 225 in the top strip 220. The holes 225 are small enough to facilitate the passage of air while substantially blocking the passage of a biodegradable material when the latter is blown into the sock. The larger holes in the bottom strip, on the other hand, provide more area for the biodegradable material 120 in the berm to blend with and adhere to the underlying soil 130.

The desirable plant species included in the biodegradable material, as used herein, may be chosen for, e.g., their aesthetic value, pest control characteristics, size, growth rate, compatibility with the surrounding area, etc.

Figure 3:
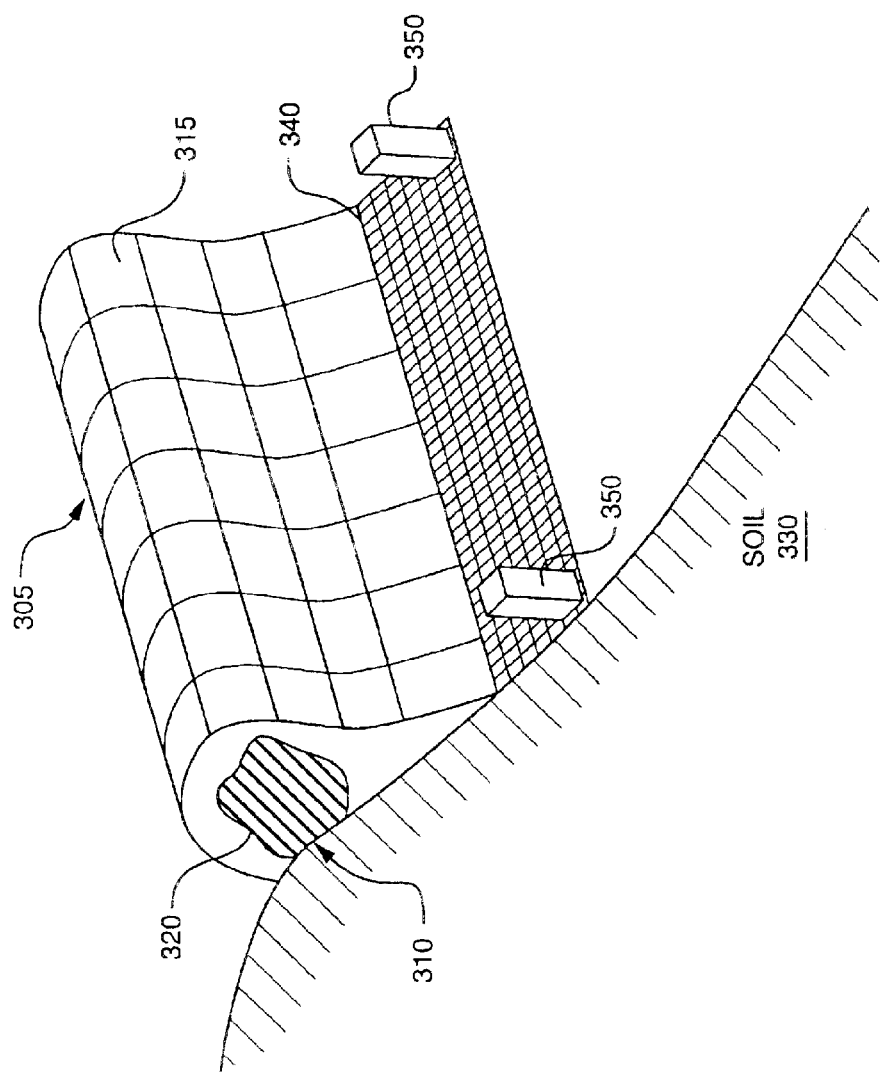
FIG. 3 illustrates a biodegradable sock, in accordance with the invention, having an added piece of material for staking the sock at an incline.

FIG. 3 illustrates a filter berm 310 placed on an inclined soil surface 330. The berm comprises a biodegradable mesh tube 305 that is substantially filled with biodegradable material 320. Again, the tube is constructed with holes 315 that are small enough to facilitate the passage of air while substantially blocking the passage of the biodegradable material 320 when the latter is blown into the tube. The berm additionally comprises a longitudinal biodegradable "flap" 340, e.g., sewn along the tube, through which stakes 350 may be placed to prevent the berm from sliding down the inclined surface.

The foregoing is a detailed description of an illustrative embodiment of the invention. Various modifications and additions can be made without departing from the spirit and scope of the invention. For example, the mesh tube may comprise a single strip having holes that differ in size between the bottom and the top. Furthermore, the tube may be constructed by sewing together a biodegradable strip on its top and a synthetic strip on its bottom, as described herein. As such, the filter berm may permanently blend into its surrounding environment since the synthetic bottom strip is buried under the berm and the exposed biodegradable top strip fully decomposes. Accordingly this description is meant to be taken only by way of example and not to otherwise limit the scope of the invention.

What is claimed is:

1. A compost filter berm that protects an area sensitive to soil movement processes, the berm comprising a mesh tube and a first biodegradable material that substantially fills the tube, wherein the exposed top portions of the tube, not covered by the first biodegradable material, are made of a second biodegradable material and the bottom portions of the mesh tube, covered by the first biodegradable material, contain relatively larger holes than the top portions of the tube.

2. The berm of claim 1, wherein the first biodegradable material contains a mixture of compost and seeds of one or more desirable plant species.

3. The berm of claim 1, wherein the tube further comprises two or more strips of material joined together along a longitudinal direction of the tube.

4. The berm of claim 3, wherein the berm is constructed from a first strip of material that is biodegradable and a second strip of material that is synthetic.

5. The berm of claim 4, wherein holes in the second strip of material are larger than holes in the first strip of material.

6. The berm of claim 1, wherein the second biodegradable material is burlap.

7. The berm of claim 1, further comprising a longitudinally extending flap used for anchoring the berm.

8. The berm of claim 1, wherein the mesh tube is constructed from a single strip of material having at least some holes that differ in size.

9. A method for installing a compost filter berm, comprising the steps of:
   constructing a mesh tube having biodegradable portions, the tube being constructed having relatively larger holes along its bottom than along its top;
   filling the tube with a biodegradable material; and
   placing the bottom of the filled tube on soil so that the exposed portions of the tube are the biodegradable portions.

10. The method of claim 9, wherein the tube is constructed from two or more strips of material joined together along a longitudinal direction of the tube.

11. The method of claim 9, wherein the biodegradable portions are made of burlap.

12. The method of claim 9, wherein the step of filling the tube further includes blowing the biodegradable material into the tube.

13. The method of claim 9, further comprising:
   connecting a longitudinally extending flap to the berm.

14. The method of claim 9, wherein the berm is constructed from a first strip of material that is biodegradable and a second strip of material that is synthetic.

15. The method of claim 14, wherein holes in the second strip of material are larger than holes in the first strip of material.

16. The method of claim 9, wherein the mesh tube is constructed from a single strip of material having at least some holes that differ in size.

* * * * *